United States Patent
Fincato et al.

(12)

(10) Patent No.: US 6,285,810 B1
(45) Date of Patent: Sep. 4, 2001

(54) TUNABLE ADD/DROP OPTICAL DEVICE

(75) Inventors: Antonio Fincato, Cameri; Maurizio Lenzi, Novara; Domenico Di Mola, Buccinasco, all of (IT)

(73) Assignee: Italtel SpA, Milan (IT)

( * ) Notice: Subject to any disclaimer, the term of this patent is extended or adjusted under 35 U.S.C. 154(b) by 0 days.

(21) Appl. No.: 09/043,697

(22) PCT Filed: Jul. 23, 1997

(86) PCT No.: PCT/EP97/03972
§ 371 Date: May 8, 1998
§ 102(e) Date: May 8, 1998

(87) PCT Pub. No.: WO98/04954
PCT Pub. Date: Feb. 5, 1998

(30) Foreign Application Priority Data

Jul. 26, 1996 (IT) ............................................... MI96A1591
Apr. 3, 1997 (IT) ............................................... MI97A0772

(51) Int. Cl.$^7$ ...................................................... G02B 6/28
(52) U.S. Cl. ................................. 385/24; 385/24; 385/3; 385/8; 385/9; 385/37; 385/46; 359/127; 359/128; 359/130
(58) Field of Search ................................... 385/24, 37, 3, 385/8–9, 46; 359/127, 128, 130

(56) References Cited

U.S. PATENT DOCUMENTS 5,249,243    9/1993   Skeie .
5,623,566  * 4/1997   Lee et al. .............................. 385/24
6,038,047  * 3/2000   Nava et al. ........................... 359/154

OTHER PUBLICATIONS

"Tuntable Gain Equalization Using a Mach–Zehnder Optical Filter in Multistage Fiber Amplifiers", Kyo Inoue, et al., IEEE Photonics Technology Letters, vol. 3, No.8, pp. 718–720, Aug. 1991, New York, NY.

"Resonant Couplers Acting as Add–Drop Filters Made with Silica–on–Silicon Waveguide Technology", Henry H. Yaffee, et al., Journal of Lightwave Technology, vol. 12, No. 6, pp. 1010–1014, Jun. 12,1994, New York, NY.

"Bandwidth Optimization of Add/Drop Filters Using a Cascaded Coupler Mach–Zehnder Configuration", C. Kostrzewa et al., Proceedings European Conference on Integrated Optics with Technical Exhibit, vol. 1, pp. 521–524, Jan. 1, 1995.

(List continued on next page.)

Primary Examiner—Frank G. Font
Assistant Examiner—Delma R. Flores Ruiz

(57) ABSTRACT

Tunable add/drop optical device for injecting or extracting (add/drop) at least a selected optical channel or carrier wavelength in or from a set of multiplexed channels or carriers of different wavelengths comprising a plurality of directional couplers (AD1 . . . AD6) and a plurality of phase-shift stages (SF1 . . . SF5) alternately connected in cascade, wherein each phase-shift stage defines a certain optical path length difference ($\Delta L1$ . . . $\Delta L5$) between two distinct optical paths of the stage. The tuning is performed modifying the refraction index of one path of said phase shift stages by means of Joule effect heating strips (L1 . . . L5) or by means of metallic field plates adapted to receive a signal suitable to modify the electric field intensity. The first two phase-shift stages of said plurality of phase-shift stages have differences of length of optical paths different from each other and in a preestablished ratio while the remaining phase-shift stages have differences of length of optical paths identical. It is thus possible to provide a device having an exceptionally flat cross response characteristic, substantially free of ripple due to an inevitable truncation of the Fourier expansion series.

20 Claims, 11 Drawing Sheets

OTHER PUBLICATIONS

"Waveguide EDFA Gain Equalization Filter", Y.P. Li, et al., Electronics Letters, vol. 31, No. 23, Nov. 9, 1995.

"Wavelength–Tuntable Add/Drop Optical Filter", B. Glance, IEEE Photonics Technology Letters, vol. 8, No. 2, Feb. 1996, pp 245–247.

"Cascaded Coupler Mach–Zehnder Channel Dropping Filters for Wavelength–Division–Multiplexed Optical System"M, Kuznetsov, Journal of Lightwave Technology, vol. 12, No. 2, pp. 266–270, Feb. 2, 1994.

"Applications of the acousto–optic tunable filter in local access networks", S.C. Liew et al., Conference Paper Presented at the Second Annual Broadband Exposition and the Fourteenth Fiber Optic Communications and Local Area Networks Exposition, (Abstract), Sep. 1990, Baltimore, MD.

"Wavelength–selective circuit and packet switching using acousto–optic tunable filters", K.W. Cheung et al., Conference Paper Presented at the IEEE Global Telecommunication Conference and Exhibition, (Abstract), Dec. 1990, San Diego, CA.

* cited by examiner

THERMO-OPTICAL EFFECT MEASUREMENTS_NORMALIZED TO MAX POWER ACQUIRED

TUNABLE ADD/DROP OPTICAL DEVICE

This application is the national phase under 35 U.S.C. §371 of prior PCT International Application No., PCT/EP97/03972, which has an International filing date of Jul. 23, 1997, which designated the United States of America, the entire contents of which are hereby incorporated by reference.

FIELD OF THE INVENTION

The present invention relates to optical telecommunication systems functioning in a wavelength division multiplexing (WVDM) mode. More in particular the invention concerns a passive four port optical coupling device for wavelength division multiplexed optical signals which may be used as a filter for injecting or extracting (add/drop) an optical carrier signal or channel of a selected wavelength, from a plurality of WDM channels of distinct wavelengths.

In the transmission of information through an optical fiber network, the wavelength division multiplexing (WDM) technique is employed for incrementing the efficiency of the network system. WDM signals consist of a plurality of optical signals of different wavelength, referred to as carriers or channels through which information may be transmitted on a fiber.

FIG. 1 shows a node N of an optical fiber transmission network that includes an add/drop device to an input port or gate to which a fiber may be coupled, carrying n optical channels corresponding to n optical wavelengths, all contained in a certain "window" of the optical spectrum in correspondence of which state of the art optical fibers show a low attenuation, typically in the so-called $III^{rd}$ window and in the amplification band of erbium.

Each channel may be separately modulated in terms of intensity of the light (amplitude) according to a digital or an analog mode of modulation. Each channel is spectrally spaced from adjacent optical channels sufficiently to prevent cross-channel interference.

The usefulness of an ability of readily introducing and/or extracting a selected optical carrier or channel to and from a WDM signal at particular location of the optical fiber transmission network in order to carry out essential communication functions among different stations is evident.

A typical example is represented by the need for a first user, connected to a certain node of the network, to transmit information to a second user connected to another node of the network. The required add/drop devices would normally have two inlet ports and two outlet ports through which simultaneously or separately, extract/introduce a signal of a selected wavelength.

In the diagram of FIG. 1, extraction from the output gate d of the device of a signal $\lambda i$ and a simultaneous injection through the input gate b of the device of a signal $\lambda i$ so that on the output gate c be present a plurality of n multiplexed (WDM) signals: $1, \ldots \lambda i \ldots n$, is assumed. In other words, at the node considered, the extraction of channel $\lambda i$ and the simultaneous addition of the channel $\lambda i$ is hypothesized to be required operation.

Optical networks of future generation are expected to integrate two complementary or interlaced architectures: one tape made of Optical Cross-Connect or more briefly OXC units and the other type consisting of ring structures based on the use of optical multiplexers of the add/drop type (OADM). Moreover, local optical networks (optical LAN) are gaining an increasing interest. The ring structure of a local optical network connecting a plurality of nodes through fibers carrying WDM channels rest primarily on the use of efficient and low cost add/drop filters.

Several forms of implementation of a suitable filter or bi-directional selective coupler suited to perform channel-adding as well as channel-dropping functions, have been proposed.

These known forms of implementation of a selective channel add/drop function usually contemplate the use of a certain number of directional couplers (AD) and phase shifters (SF), alternately connected in cascade, as depicted in FIG. 2.

Notably, a directional coupler is implemented by a pair of waveguides running parallel to each other at a certain distance of separation d (not visible in the figure for graphical reasons), for a certain length 1. The separation distance d and the length 1 are designed so as to determine a transfer of light energy from one guide to the other.

A phase shifter may be conveniently implemented by a pair of waveguides of different length that do not exchange energy among each other and introduce a relative phase shift of a predetermined value in the two optical signals (introduced through respective input ports) as output through respective output ports of the device.

The couplers (AD) are designed through an optimization procedure and usually are different from each other, while the phase shifters (SF), in view of the fact that they determine the periodicity of the transfer function of the filter, are customarily designed to be all substantially identical to each other.

The signal $\lambda i$ to be extracted is singled out by the sum of the effective lengths 1 of the single directional couplers. In the design stage, the sum of the guided wavelength equivalent length 1 of the single directional couplers is made equal to the guided wavelength equivalent coupling length L for the selected wavelength $\lambda i$.

In order to better understand the function of the single phase shifting stages, let us consider the transfer function of the device of FIG. 3.

As will be evident from the observation of FIG. 3, the transfer function is not sinusoidal as that of a WDM device, but shows a periodical form in terms of frequency, characterized by the presence of a spectral interval of separation between two successive peaks of the response characteristic of width sufficient to contain all the wavelengths of the WDM signal with the exception of the wavelength to be extracted.

In other words, all the channels that are not the object of the channel drop operation performed by the device, are available on an output gate of the device in a substantially nonattenuated state, while the selected channel is strongly attenuated (bar response characteristics traced with a continuous line). A dual situation occurs on the other output gate (cross response characteristics traced with a dash line) whereas the channel to be extracted is available in a substantially nonattenuated form while all the other (deselected) channels are strongly attenuated.

The known device in question is perfectly symmetric, so that if a channel $\lambda i^*$ is injected through gate b, such a channel $\lambda i$ will be present on the output gate c together with the other channels $1 \ldots n$ unaffected by a channel drop operation. In other words, in cross function, the channel to be extracted or injected passes from gate a to gate d or from gate b to gate c, while according to the bar function, all other channels (through channels) pass from gate a to gate c or from gate b to gate d.

By modifying the geometry of the phase shift stages, that is by modifying the relative delay of propagation that is introduced by the stages, the response characteristics of the device may be modified. Given the periodical form of the response characteristics of the device, it is possible to widen or narrow the interval of wavelength between two successive strongly attenuated wavelengths. In practice, if a broadening of this interval is desired, the relative delay introduced by the phase shift stages must be reduced, while by increasing said delay the interval is narrowed.

The number of "cells" composing the device, intending as an elementary cell the association of a phase shift stage with a relative directional coupler, that is the number of phase shift stages (SF) composing the device, has a direct influence on the attenuation characteristics of the device. More precisely, the attenuation in the interval comprised between two strongly attenuated wavelengths produced by the device is more uniform the larger the number of cells that compose the selective device.

For a deeper understanding of the functionality of a selective device suitable to implement channel adding and channel dropping functions, reference may be made to the article entitled: "Cascaded Coupler Mach-Zehnder Channel Dropping Filters for Wavelength—Division Multiplexed Optical System" by M. Kuznetsov, Journal of Lightwave Technology, Vol. 12, No. 2, February 1994.

For example, in the perspective of a European development project having as objective the realization of a high performance optical LAN, the development of a relatively low cost optical filter suitable to perform add/drop functions that can be fabricated according to available technologies, and which may be tuned on any wavelength selectable from a plurality of WDM wavelengths, is considered a basic requirement.

In developing a COBNET local network as mentioned above, the requisites of add/drop optical filters needed for equipping each node of the network may be defined as follows.

1) The add/drop filter must show an exceptionally low though loss ($L_{through}$) in view of the fact that this loss is sustained many times by the WDM signal circulating in the ring. The power budget must be calculated for the least privileged channel of the cascade of all the add/drop filters of the LAN. System's analysis show that by assuming a typical sensitivity of the receiver in the vicinity of −32 dBm, the tolerable maximum value for $L_{through}$ is of about 5 dB (for a four node ring) and of about 2.5 dB (for an eight node ring).

2) In view of the fact that injection and extraction losses, $L_{add}$ and $L_{drop}$, respectively, are sustained only once by the selected channel being subjected to the add/drop operations, the level of these losses is less critical and they may comfortably have a value similar to $L_{through}$.

3) The number of communication channels that may be managed by the system is typically much larger than the number of WDM wavelengths (for example, 32 communication channels may be managed with only eight WDM carrier wavelengths on each fiber of the ring).

These multiplexed communication channels may, in principle, have different bitrates as well as different format and power levels. The WDM combs at the input of the add/drop filters may therefore be heterogeneous. Therefore optical crosstalk phenomena become particularly critical in these systems.

Each receiver is subject to the effect of several different crosstalk contributions, which may classified as of same wavelength (homowavelengh), when the interfering channels and the received channels have the same optical carrier wavelength, and of different wavelength (heterowavelength) in all the other instances. The signal/crosstalk ratio (SCR) in socalled "low end" (LE) receivers and in so-called "high end" (HE) receivers, evaluated on the base of crosstalk isolation coefficients of the add/drop filters: $X_{bar}$ and $X_{cross}$, show that the most damaging contribution may be attributed to the crosstalk of same wavelength, as that generated by a high power channel that has just been injected on the channel of identical wavelength being extracted.

The large difference among respective powers of interfering channels and the large number of stations in which crosstalk phenomena may take place in certain transmission systems, may significantly depress the system's SCR ratio notwithstanding an apparently acceptable crosstalk coefficient of a single add/drop filter.

Exceptionally severe requirements are imposed therefore on design specifications of add/drop filters in order to assure that their spectral response will guarantee an $X_{bar}$ coefficient (relevant to homowavelength crosstalk) lower than −25 dB and an $X_{cross}$ coefficient lower than −20 dB.

4) On the other hand, cost considerations of these local transmission systems impose to renounce to the use of dedicated wavelength stabilization systems. Therefore, the so-called Free Spectral Range or briefly FSR of each filter must be exceptionally precise and the crosstalk isolation coefficients, $X_{bar}$ and $X_{cross}$, must remain within the specified limits for a relatively broad spectral range (>50 GHz).

Therefore the technical problem is that of making an add/drop device (filter) tunable in operation, that is to permit to tune the device on anyone of the WDM optical channels in order that at each node anyone of the channels: $\lambda 1 \ldots \lambda n$, may be extracted/injected, that is a selected channel to be extracted $\lambda i$ and/or injected $\lambda i$.

REVIEW AND DISCUSSION OF THE PRIOR ART

In principle, known multiplexing and demultiplexing optical filters have an architecture that permits optimization adjustments of their performance (trimming) in terms of selectivity and of power losses, but their configuration remains substantially unmodifiable. In other words, once a certain configuration of connections of the fibers to the respective ports is established, the correspondence between a certain channel and a fiber remains fixed or may be modified only by changing the connections.

Trimming techniques of the response characteristics of multiplexing and demultiplexing optical filters have been proposed for implementing "gain equalization" filters to be associated to fiber amplifiers and such a technique is described in the article: "Waveguide EDFA in equalization filter" by Y. P. Li, C. H. Henry, E. J. Laskowski, C. Y. Mak and H. H. Yaffe, Electronics Letters, Nov. 9, 1995, Vol. 31, No. 23.

According to the technique described in the above-noted article, the construction of a filter with a passband of about 30 nm is based on an Fourier expansion, starting from transfer matrices of an ideal directional coupler and of an ideal phase shifter. By assuming to realize the filter using a number k of phase shift stages and a number k−1 of directional couplers alternately connected in cascade, by defining the single directional couplers on the base of the coefficients of the terms of the Fourier expansion series, a truncated Fourier series is implemented. In order to synthesize the desired filter, the effective lengths of the directional couplers and the delays introduced by the phase shift stages are optimized in order to obtain a truncated series that approximate at best the desired response characteristic of the filter. The result of this synthetization process of an optical filter is depicted in FIG. 2 of the above-identified article. As may be observed, the cross response characteristic shows an ample ripple, that is a marked variation of the attenuation, as inevitable consequence of the truncating of the Fourier expansion series.

On the other hand, it is evident that cost and power loss considerations impose to limit the total number of cells, that is of phase shift stages, employed for implementing the filter.

The known optical filters, beside the trimming devices that they eventually integrate or the definition methods of the relative passbands, remain selective structures, the spectral response characteristics of which are substantially fixed.

In order to overcome this lack of flexibility of optical filters and make them suitable for add/drop functions, the use of an acousto-optical filter has been proposed which would permit to tune the filter on a selected channel of a WDM optical signal. Such a solution is described in the article "Acousto-optics Tunable Alters in Narrowband WDM Networks; System Issues and Network Applications" by K. W. Cheung, Journal of Selected Areas in Communications, Vol. 8, No. 6, pages 1015–1025 (August 1990).

The tuning is performed by acousto-optic means and therefore the system requires a source of tunable acoustic waves of high precision.

A different solution to the problem is described in the U.S. Pat. No. 5,488,500 of Bernard Glance, published on Jan. 30, 1996, and in the article of the same author: "Wavelength-Tunable Add/Drop Optical Filter", IEEE Photonics Technology Letters, Vol. 8, No. 2, February 1996.

According to this approach, a bi-directional filter for add/drop operations is based on the architecture depicted in FIG. 4 of the above noted article, that comprises:
- a first array of optical switches, identified by the notation: "1×N Optical Switch";
- a first Wavelength Grating Router (WGR), identified by the notation "N×N WGR", having an output to which the channel being extracted (dropped channel) corresponds;
- a second Wavelength Grating Router (WGR) having an input through which the channel being inserted (added channel) is fed;
- a second array of optical switches.

With present state-of-the-art, optical switches must be implemented by the use of mechanical devices and therefore the two necessary arrays of optical switches are relatively burdensome and costly. Moreover, each of the two required WGR devices may also be regarded as a WDM array and therefore overall system complexity is not negligible.

OBJECTS OF THE INVENTION

One objects of the present invention is to implement a tunable add/drop device free of the drawbacks and limitations mentioned above with reference to the prior art devices. A particular object is that of implementing a device having a reduced complexity and cost as compared to the known devices.

A further object is to reduce the design and fabrication criticality of an add/drop filter by providing a device having an exceptionally flat cross response characteristic, substantially free of "ripple" due to an inevitable truncation of the Fourier expansion series in designing the device as a finite number of stages. System's design requirements impose that such passive optical devices have an FWHM sufficiently broad as compared to the Free Spectral Range (FSR), typically an FWHM of at least 3–5 nm for an FSR of 12.8 nm, and that at the same time be amenable to compensate the inevitable fabrication spread of the design parameters, which would otherwise severely affect the homowavelength cross-talk characteristic of the equivalent resonating coupler. The device of the invention fulfil also these important requirements.

SUMMARY OF THE INVENTION

Object of the present invention is a tunable add/drop device for wavelength division multiplexed (WDM) signals comprising a plurality of directional couplers alternately connected in cascade with a plurality of phase-shift stages, each implemented by two optical paths of different length.

The device of this invention is characterized by the fact that it has means for modifying the refraction index of the optical medium composing one of the two optical paths of each phase-shift stage, determining a correspondingly identical variation of the phase shift that is introduced by each phase-shift stage of the cascade.

Such a variation of the effective optical path difference determines a shift of the response characteristic of the device, aligning it on the selected wavelength of the channel to be extracted (or to be injected) from the plurality of channels of the WDM signal transmitted on the optical network.

According to a first aspect of the invention, the tunability of the filter is achieved by a thermo-optical effect.

According to a different aspect of the invention, the tunability is achieved by an electro-optical effect.

Thus the invention contemplates the exploiting of a thermo-optical and/or electro-optical effect for introducing an additional phase shift value through each phase-shift stage of the device of a selectable value, tuning the filter on the wavelength of interest for performing a desired channel dropping and channel adding operation.

The tuning control may be implemented either in an open loop or in a closed loop mode, depending on the intrinsic stability characteristics of the tuning circuits.

Each tunable filter of the invention may for example be tested at the end of its fabrication process in order to univocally establish its bias characteristics from which precise bias values may be derived for ensuring a precise tuning of the filter on a respective wavelength or channel.

According to an alternative embodiment of the invention, the tuning of the filter of the invention may be optimized in an automatic way through a dedicated control loop, preferably by exploiting a dedicated low frequency modulation of the optical WDM signal which may be demodulated and detected similarly to the other information containing modulating signals of the optical carrier signals. The detection of the low frequency modulating signal produces eventually a DC signal that can be used to increment or decrement the nominal bias relative to the selected channel (either thermo-optical or electro-optical bias) to the tuning elements to achieve and maintain optimal tuning conditions. The device of the invention may be readily fabricated according to a so-called "glass-on-silicon" technology that permits a relatively simple and precise realization of the tuning elements in case of a thermo-optical tuning system, the maximum tuning delay (that is the time necessary for shifting the peak of the response characteristic of the filter from a spectral position centered on a first wavelength of the WDM signal, to a position centered on the farthest in terms of spectral distance from said first wavelength) may be in the order of one or several microseconds. Such a tuning time is quite compatible with system's requirements for the add/drop devices.

Even shorter tuning times may be achieved by exploiting an electro-optical effect instead of a thermo-optical one. Such an alternative embodiment requires the use of special materials such as for example lithium niobate or organic polymers for the waveguides or for the portion thereof onto which the tuning control by electro-optical effect is exerted.

The essential aspects and characteristics of the invention are set for in the appended claims.

BRIEF DESCRIPTION OF THE DRAWINGS

The invention will be more easily understood from the following description of several important embodiments, here provided solely for illustrative and nonlimitative purposes, and by referring to the attached drawings, wherein.

DESCRIPTION OF PREFERRED EMBODIMENTS

Figure 1:
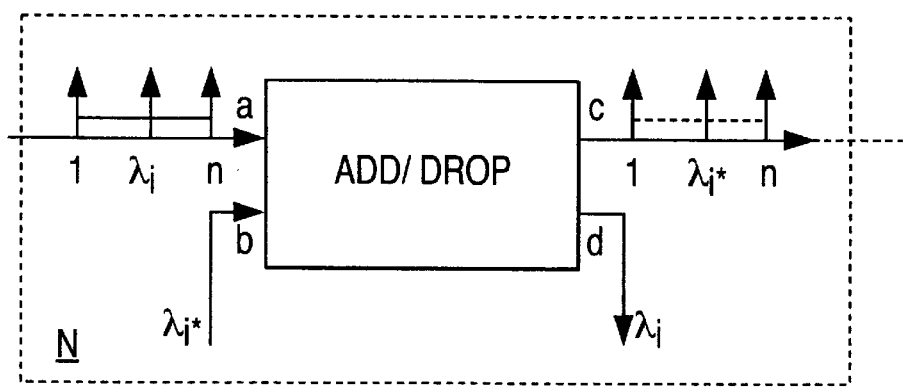
FIG. 1, as already commented above, shows a node N of an optical fiber transmission network.
Figure 2:
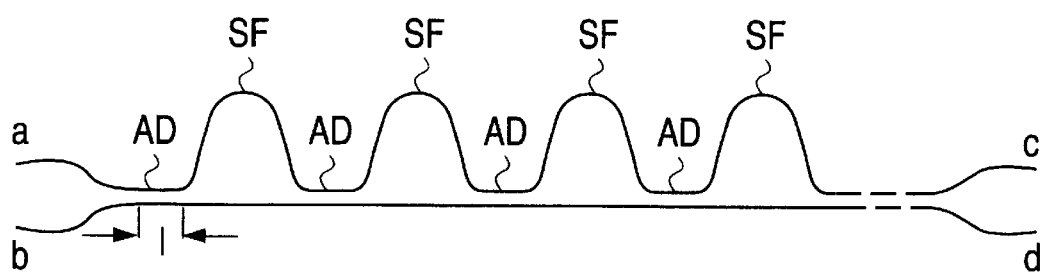
FIG. 2, as already commented above, shows the general architecture of a known add/drop device.
Figure 3:
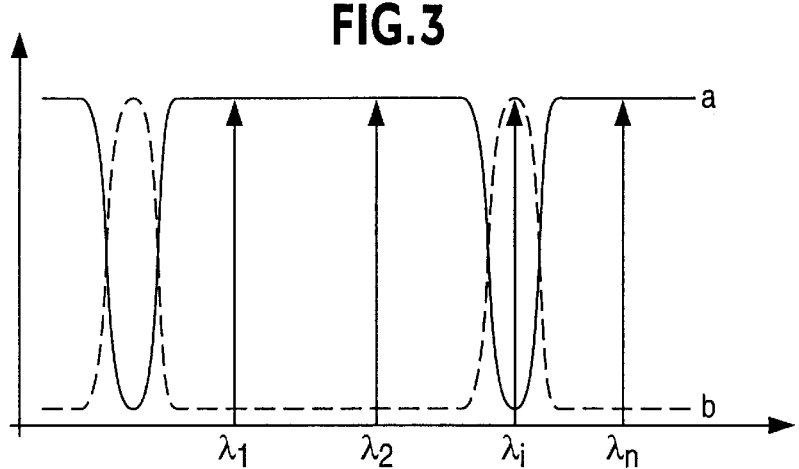
FIG. 3, as already commented above, shows the response characteristic of the device of FIG. 2.
Figure 4:
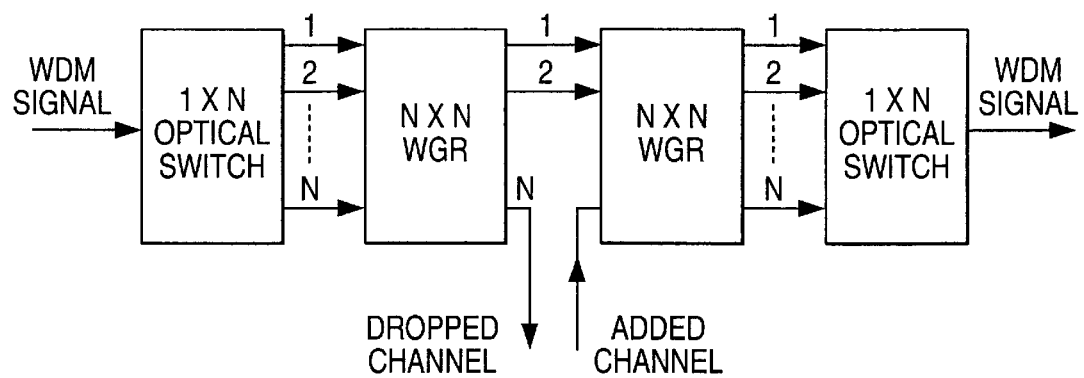
FIG. 4 shows a tunable add/drop device according to a known architecture.
Figure 5:
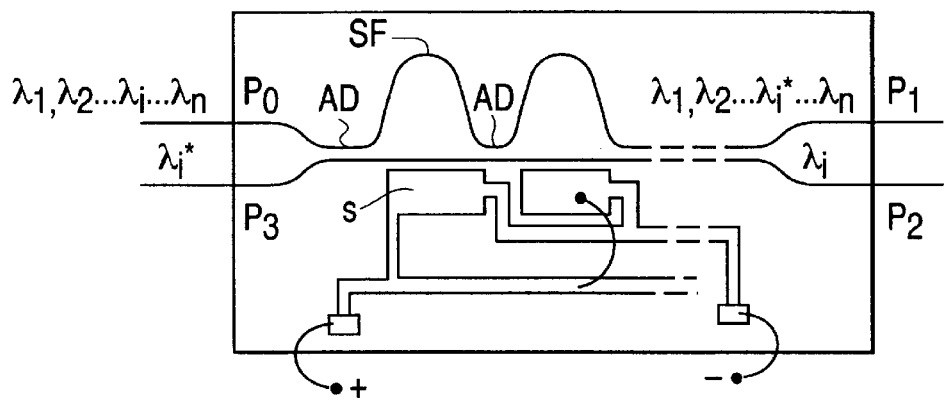
FIG. 5 shows the basic diagram of a tunable optical filter according to the present invention.

FIG. 5 shows the add/drop device of the present invention composed of a cascade of an alternate sequence of directional couplers AD and of phase-shift stages SF.

Tuning elements S (in electrical parallel arrangement) are shown in FIG. 5, which, preferably by a thermo-optical effect, permits to tune the add/drop device on a selected channel to be extracted ($\lambda i$) and injected ($\lambda i^*$).

As will become even more clear in the following description with reference to FIG. 8, the tuning elements may consists of a plurality of heaters or heating strips disposed in proximity of one of the two optical supports that implement each phase-shift stage SF in order to introduce an extra delay in addition to the delay of propagation (phase shift) that is introduced by the geometry of the phase-shift stage.

In particular, such an extra delay or phase shift is introduced in each phase shifting stage that composes the device by modifying the refraction index of the medium with which one of the two optical supports (paths) that form the phase shifting stage is made. In practice, an optical glass waveguide may be heated to modify locally its refraction index. Alternatively, by making the optical waveguides with an appropriate material such as for example a polymer or lithium niobate, the refraction index may be modified by locally applying an electric field across the waveguide by the use of juxtaposed electrodes.

The refraction index is modified locally on a portion of waveguide so as to alter the difference of optical path on the two optical supports (waveguides) with which a phase-shift stage is made. In fact:

$$\Delta L_{optical} = \Delta L_{geometric} * \eta_{effective}$$

where $\eta_{effective}$ represents the refraction index of the light transmitting medium.

In other words:

$$\Delta L_{optical} = L_2 * \eta_{eff2} - L_1 * \eta_{eff1}$$

where $L_1$ and $L_2$ are the length of the optical support of the arm 1 and of the arm 2, respectively, of the phase-shift stage and $\eta_{eff1}$ and $\eta_{eff2}$ represent the effective refraction index of the medium of the two optical supports that constitute each phase-shift stage.

By considering that the invention contemplates a modification of the effective refraction index of the medium crossed by only one of the two optical supports (paths) by exploiting a thermo-optical effect or an electro-optical effect, it is evident that according to the invention, an extra phase delay of a predetermined value is introduced in only one optical path of the two paths of each phase-shift stage.

In other words, the invention contemplates that in addition to the effect of the geometric difference between the respective lengths of the optical paths, proper of an add/drop device of the type in question, a further phase shift be introduced by modifying the effective refraction index of the medium crossed by only one of the two optical paths of the phase-shift stage.

According to a preferred embodiment of the invention, the modification of the effective refraction index is performed by thermo-optical effect and to this end to one of the two waveguides that compose each phase-shift stage is associated a heater or heating strip.

These heaters may be driven in a voltage or in a current mode and they may be electrically connected in parallel or in series among each other and to either a controlled voltage generator or to a controlled current generator, through appropriate lead wires that may be bonded to the metal strips "integrated" in the device.

Patterned thin films of chromium, nickel-chromium alloys or of an equivalent metallic material that may be deposited by chemical vapor deposition techniques or by sputtering and patterned through a masking and etching step, may be used satisfactorily for realizing the tuning elements.

Integrated heaters may be in the form of patterned strips of a resistive metal of width in the order of 10 to 100 $\mu$m, length of about 2–3 mm and thickness of several hundreds nm.

Figure 6:
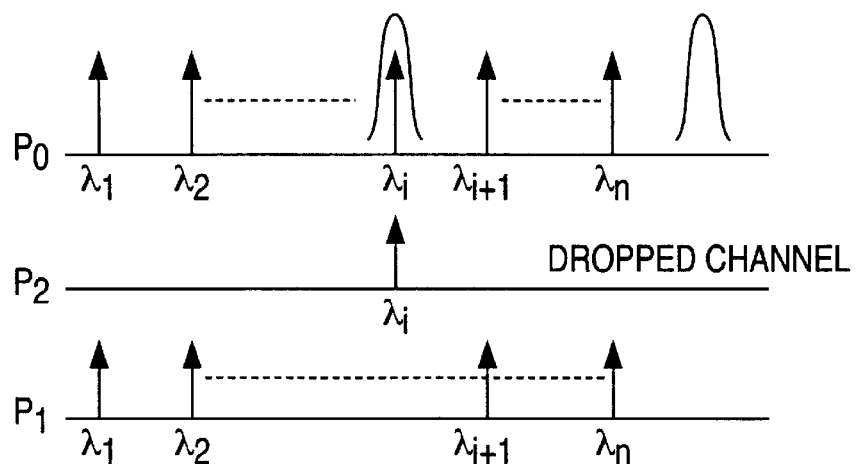
FIG. 6 diagrammatically shows the operation of the device of the invention as a channel dropper in a receiver.

The function of a tunable device of the invention of FIG. 5, functioning as a channel dropper from a WDM signal fed through the optical port $P_0$ is diagrammatically depicted in a in-tune condition in FIG. 6, showing its response peak (resonance peak) centered on the selected wavelength $\lambda_j$. The selected channel, corresponding to the wavelength $\lambda_j$, is available on the optical port $P_2$, while all the other deselected channels of the WDM signal are available on the optical port $P_1$ of the device.

Figure 7:
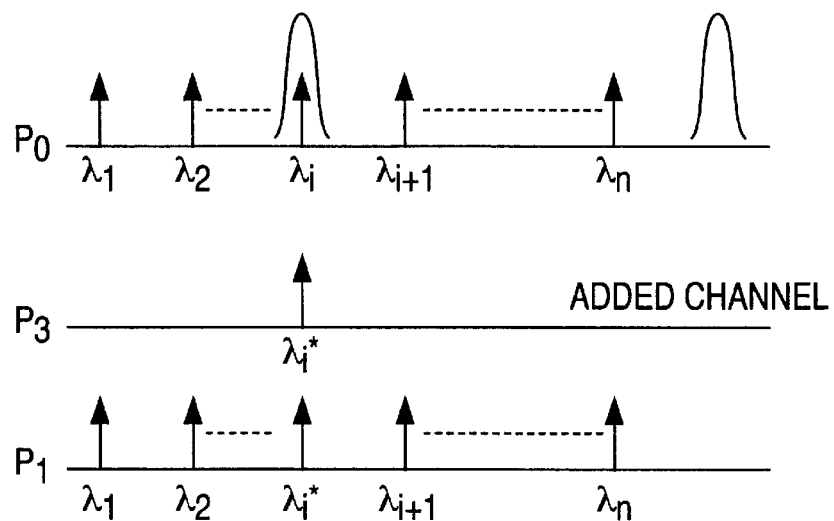
FIG. 7 diagrammatically shows the operation of the device of the invention as a channel adder in a transmitter.

A dual condition of operation of the same device, that is as a channel-adder for injecting a channel of wavelength $\lambda 1*$ in a WDM signal fed through the optical port $P_0$ of the device is depicted in FIG. 7. The signal $\lambda 1*$ injected through the optical port $P_3$ of the device adds itself to the plurality of WDM channels injected through the port $P_0$ and the totality of channels is available on the output port $P_1$ of the device.

Figure 8:
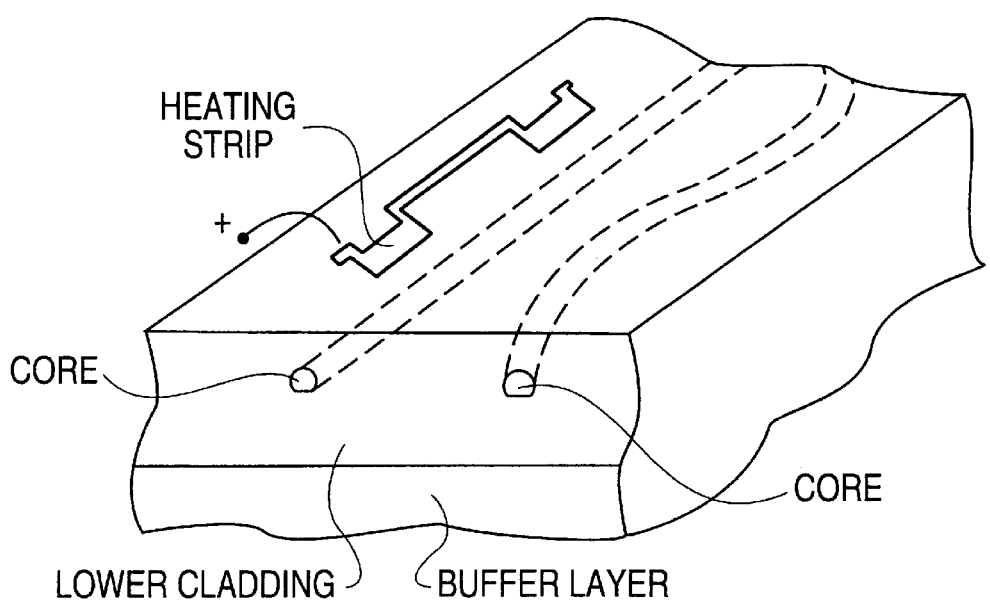
FIG. 8 is a partial sectional view of the device of the invention according to a first embodiment.

According to a preferred embodiment depicted in FIG. 8, the device may be fabricated in an integrated form according to a so-called glass-on-silicon technology or by equivalent fabrication processes of integrated optical devices. The tunability of the add/drop filter of the invention is preferably implemented by a thermo-optical mechanism.

According to this preferred embodiment, the tuning elements (arranged in electrical series in FIG. 8) may be patterned strips of a metallization film shown in the figure with the notation "heating strip", which may be photolithographically defined on the surface of the upper cladding dielectric material projectively over a portion of one of the two optical paths.

The patterning of a metallic heating strip may be suds as to reproduce a profile substantially corresponding to a geometric projection of the straight arm waveguide portions (or alternatively of the curved arm portions) of the various phase-shift stages in cascade, so as to minimize thermal inertia effects.

Through the continues metal line a current of a level suitable to provoke the raising of the temperature to a certain value may be forced in a precisely controlled manner.

According to a first embodiment, based on the exploitation of a thermo-optical effect, only a heating strip is used. According to a different embodiment, a Peltier cell is applied on the opposite face of the device juxtaposedly each heating strip. According to this alternative embodiment, the performance in terms of a more effective thermal dissipation and tuning times of the device is improved.

By employing a Peltier cell (not illustrated in the figures) on the face of the device opposite to the one on which the heater is disposed, it is possible to confine more precisely the heated zone in the vicinity of the portion of waveguide to be heated, by ensuring a "local" heat dissipation to prevent undesired propagation from the heater toward other portions of waveguide that should not be heated.

By recalling the fact that the tuning is based on the introduction of an offsetting delay on only one of the two optical paths that form the phase-shift stage, the heating must involve only one of the two optical waveguides.

The use of Peltier cells therefore facilitates the control of the thermal bias and optimization of tuning speed and stability.

Each fabricated device will possess an intrinsic thermal characteristic from which the operating temperature corresponding to a given resonance frequency may be derived. An appropriate bias current suitable to produce by Joule effect the heating of the waveguide to the correct tuning temperature of the filter for any given wavelength may therefore be readily established. Simple regulation systems of the bias signal, for example in the form of a current forced through the various heating elements in series (or in parallel), functioning in an open loop or in a closed loop mode, are readily implementable and they can ensure the maintaining of a correct tuning temperature for any selected wavelength. Being these temperature control systems familiar to any technician with a normal knowledge of electronic control circuitry, a reiterated description of the many forms these circuits may assume is not deemed necessary for a full comprehension of the invention and of the manner in which it may be practiced. According to another embodiment of the invention, instead of a thermal optical effect an electro-optical effect may be employed for tuning the filter on a selected wavelength.

Figure 9:
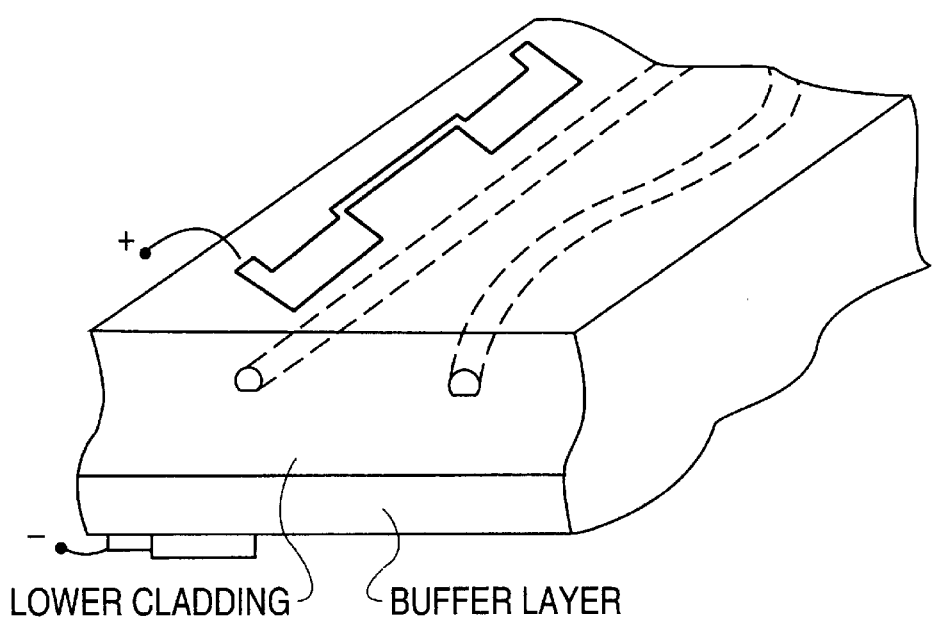
FIG. 9 shows a partial sectional view of the device of the invention according to an alternative embodiment.

This alternative embodiment is schematically depicted in FIG. 9 and requires the realization of both optical paths or at least of the optical path whose refraction index must be modified for introducing the required extra phase shift, with a suitable polymer or with lithium niobate.

According to this alternative embodiment, the tuning element is a capacitor, a plate of which may be patterned in a similar way of a heating strip. The counterplate the capacitor is preferably common to all the elements and constituted by a continuous metallization layer formed on the rear or bottom face of the integrated device.

Irrespective of the mechanism exploited, the tunable filter of the invention lends itself to implement an automatic tuning system.

Accordingly, a special low frequency modulation could be imparted to each channel or carrier wavelength of the WDM signal besides its modulation with information carrying signals or, more simply, a low level and low frequency modulation may be imparted to the WDM signal though the filter itself.

A dedicated low frequency modulating signal as detected in a receiver may provide a DC level representative of the level of the demodulated and detected low frequency modulating signal usable by an appropriate tuning control loop for maintaining optimal tuning of the filter on the selected channel ($\lambda$i).

Any known tuning optimization circuitry, adapted to the particular requirements of the add/drop filter of the invention, may be used for implementing an automatic functioning of the tunable filter of the invention.

Figure 10:
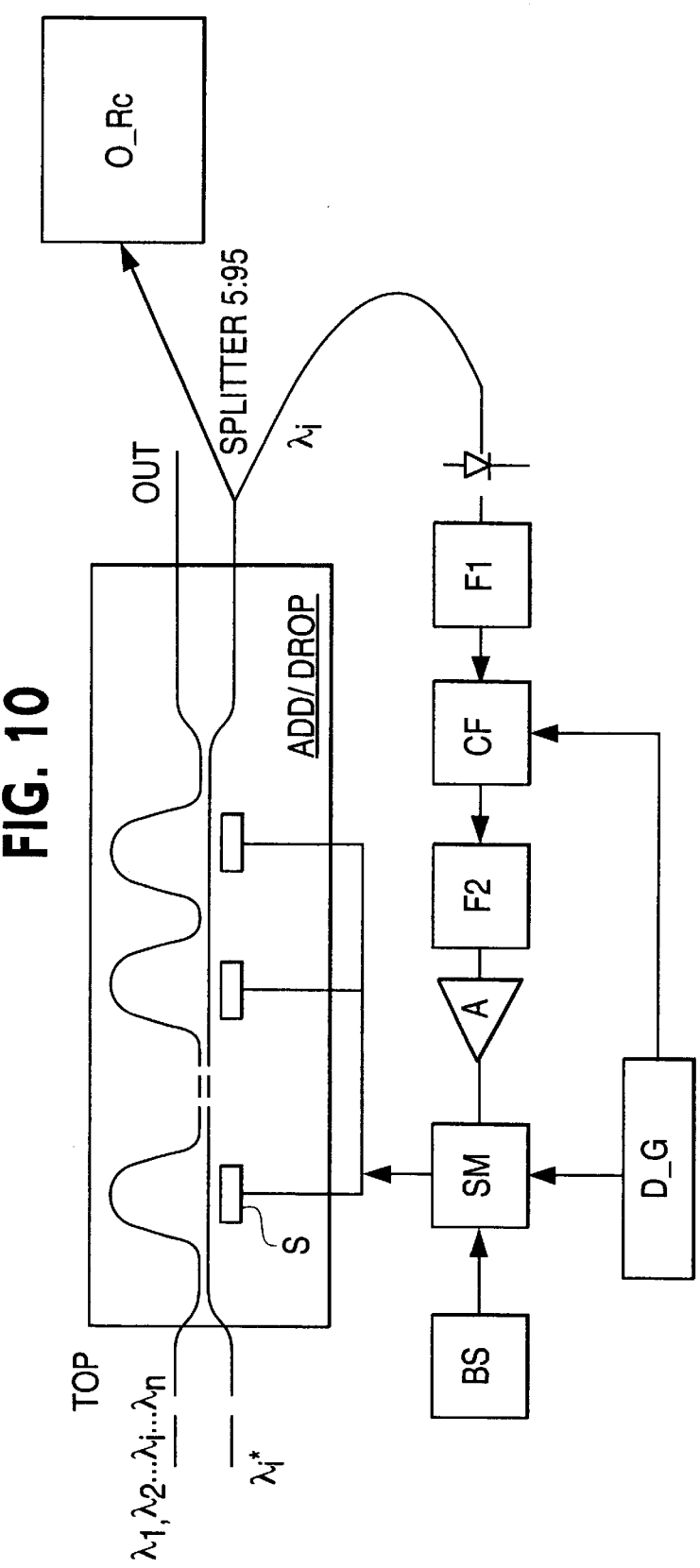
FIG. 10 is a functional diagram of a device of the invention provided with an automatic tuning control.

A simplified block diagram of a tunable add/drop filter including an efficient tuning control system, according to an embodiment of this invention, is depicted in FIG. 10.

The closed loop tuning control system depicted in the figure exploits the tunable filter itself for introducing a low level, low frequency modulation on the WDM signal through a so called "dithering" technique.

According to the embodiment shown, the tunable filter represented by the chain of alternately disposed phase shifting MZI and directional couplers, is supposed to be tunable on a selected channel $\lambda_i$ by forcing a certain (that is of a known nominal level) current through heaters S, juxtaposed to the straight arm waveguide of the MZI stages, as schematically shown in the figure.

According to this embodiment, the selected channel $\lambda_i$ being extracted through the drop port of the filter may be divided by a common splitter 5:95, in order to derive a small fraction of the light power of the channel, while the major portion (95%.) is directed to a normal optical/electronic conversion circuitry of the optical receiver O_Rc. An eventually modified information may be reinjected in the WDM signal on the same channel $\lambda i^*$ through the add port of the add/drop filter. The derived fraction ($\leq 5\%$) is also converted into an electrical signal, as schematized in the figure by the photodiode symbol at the output of which a first filter F1 is connected.

Periodically and for a short time, to the nominal biasing DC current generated by a dedicated bias generator BS is summed on the node SM a sinusoidal current of a fractionary amplitude (as compared to the level of the DC bias current, produced by the bias generator), which is generated by a dither generator D_G. The frequency of the sinusoidal current may be generally equal or lower than 2 kHz and chosen in function of the thermal inertial characteristics of the heating arrangement of the straight portions of the waveguides of the various MZI phase-shifting stages of the filter. This frequency may be as low as 100–200 Hz.

The superimposition of a sinusoidal current on the DC bias current produces an alternate shifting of the operating point of the filter in the neighborough of the selected wavelength (optical channel) onto which the filter should be perfectly tuned. This low frequency alternate shift (of relatively small amplitude in terms of frequency) of the operating point of the filter introduces a corresponding low frequency amplitude modulation on the WDM signal passing through the filter. Such a low frequency modulation will also be present on the dropped channel ($\lambda_i$). While the low frequency modulation will not materially disturb the demodulation and detection of the information carrying signals (of generally much higher frequency) in the optical receiver circuitry, this low frequency modulating sinusoidal signal is compared (in terms of difference of phase) with the original sinusoidal signal generated by the dither generator and the resulting error (phase) signal, preferably filtered though a passband filter F2 and suitably buffered, as shown in the diagram, is injected on the summation node SM. According to such a dithering technique, the phase of the reconstructed sinusoidal signal, compared by means of a unit CF with the phase of the original sinusoidal signal injected on the summation node SM by the dither generator, produces by means of a further filter F2 and an amplifier A an information representative of the actual point of operation of the tunable optical filter and therefore of an eventual need to increment or decrement the bias current, generated by means of a unit BS, to shift the resonance peak of the optical filter toward a lower wavelength or a higher wavelength. The tuning control loop circuit (not shown in the figure) may be such as to nullify the phase error signal by suitably incrementing or decrementing the actual bias current to the tuning heaters S for the selected channel.

This dithering type of fine tuning adjustment can be carried out periodically to check and trim the tuning automatically, thus compensating for long term drifts of the preestablished tuning conditions of the filter. Therefore, the fine tuning intervention may be periodical and of short duration so that the low frequency modulation that is purposely imparted to the WDM signal is temporary and does not materially affect the transmission of information through the optical network.

Definition of the Design Parameters of the Tunable Filter of the Invention

Figure 11:
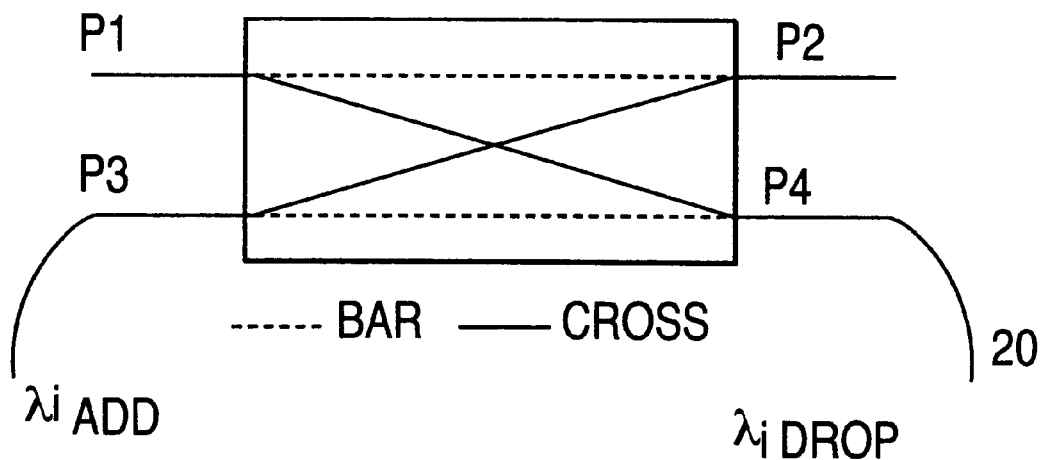
FIG. 11 is a functional diagram of a generic add/drop device based on the principle of a resonating coupler, implementable according to the present invention.
Figure 12:
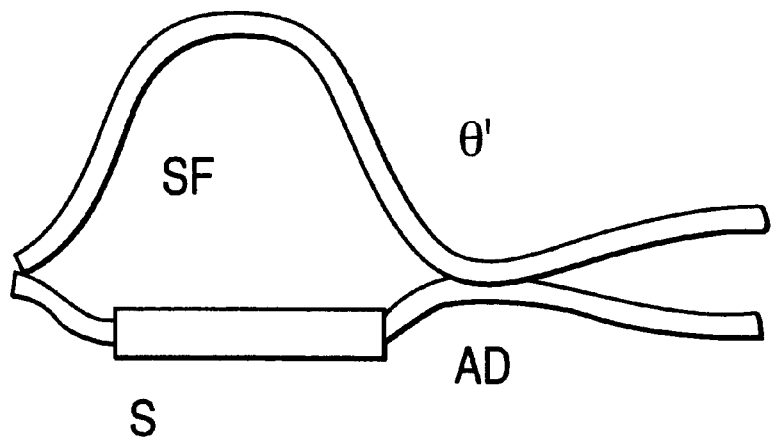
FIG. 12 is a functional diagram of a single cell of the tunable device of the invention.

The definition of the three essential design parameters of a static selective device schematized in FIG. 11, is done by assuming that each cell of the device is composed of a phase shift stage SF and a directional coupler AD, as shown in FIG. 12 and that therefore the entire filter is constituted by a chain of k phase shift stages SF (typically interferometers based on the Mach-Zehnder principle or MZI stages) connected to each other by a number k+1 of directional optical couplers AD.

The phase shift due to thermo-optical effect on the straight part of the two unequal arms of a phase-shift stage, induced for example by employing a heating strip of length $l_n$, driven in a current mode, may be included in the matrix formulation:

$$T^i = \begin{bmatrix} e^{\frac{-j(\Phi + \phi^i - \Delta(T))}{2}} & 0 \\ 0 & e^{\frac{+j(\Phi + \phi^i - \Delta(T))}{2}} \end{bmatrix} \begin{bmatrix} \cos\Theta^i & j\sin\Theta^i \\ j\sin\Theta^i & \cos\Theta^i \end{bmatrix} \quad (1)$$

where $\Theta^i$ is the coupling angle and $\Phi + \phi^i$ is the phase shift due to the unequal arm lengths of each MZI stage SF of the chain.

$\Delta(T)$ represents the phase shift contribution that depends on the temperature, controlled by the heater $l_n$ of FIG. 12.

For a device composed of. a number k=5 of stages, there will be also k+1=6 directional couplers, thus determining a transfer function that, may be expressed by the following overall matrix:

$$T = \begin{bmatrix} \cos\Theta^0 & j\sin\Theta^0 \\ j\sin\Theta^0 & \cos\Theta^0 \end{bmatrix} \prod_{k=1}^{5} T^i \quad (2)$$

$T_{11}$ matrix elements correspond to the "bar" transfer characteristic (the optical signal paths of which are indicated with a dash line in the functional diagram of FIG. 11) while the matrix elements $T_{12}$ correspond to the cross function (the optical signal paths of which are indicated with a continuous line in the functional diagram of FIG. 11).

The frequency transfer function can be expressed by the following Fourier series:

$$F(\omega) = \sum_{k=0}^{N} f_k e^{-jk\omega f_o^{-1}} \quad (3)$$

where $\omega$ is the relative optical angular frequency.

By replacing the term $e^{-j\omega f0^{-1}}$ with a complex variable $z^{-1}$, the frequency response becomes a polynomial function with complex coefficients of the variable z in the z-plane:

$$F(z) = \sum_{k=0}^{N} f_k z^{-k} \quad (4)$$

According to a preferred embodiment of the invention, instead of employing a classical tapered distribution of the couplers' strength, as proposed in the article: "Cascaded Coupler Mach-Zehnder Channel Dropping Filters for Wavelength—Division Multiplexed Optical Systems" by M. Kuznetsov, Journal of Lightwave Technology, Vol. 12, No. 2, February 1994, or a Chebychev distribution of the $f_k$ coefficients of the polynomial function (real positive coefficients) for suppressing sidelobes responsible of incoherent crosstalk at off-resonance wavelengths, a desired frequency response is selected and such a frequency response is expressed in a Fourier series. A superimposition in the plane of the z transform is then operated with said preselected response characteristic by employing a polynomial of a predefined order, corresponding to the number k of stages that are intended to be used for implementing the static filter.

The method of the invention, by allowing during the design stage to account for the effects on the spectral behavior of the sidelobes contribution to the cross response characteristic according to design criteria of Chebychev electronic filters while preserving a substantially flat cross response characteristic, "substantially free of ripple", gives outstanding advantages if compared with the above mentioned known design approaches.

Since the spectral position of a given WDM channel is fixed by the transmission system's specifications, the polynomial of k order in the domain of the z transform may be optimized in order to produce its respective zeroes of the cross transfer function substantially coincident with the spectral position of the channel. This permits to fulfil the requirements related to heterowavelength crosstalk with a reduced number (k) of cells (or MZI stages).

According to this design approach of the selective static device of the invention, though requiring the realization of at least a phase-shift stage of the device with a difference of optical paths different from that of the other phase-shift stages, has been surprisingly found that an exceptionally flat cross response characteristic can be achieved, capable of fulfilling even the most stringent homowavelength crosstalk specifications for the channel fat must be injected or extracted through the device of the invention.

The phase-shift stage with an optical path difference different from that of all the other phase-shift stages composing the add/drop tunable filter of the invention, may irrespectively be the first one or the second of the sequence of phase-shift stages, starting from the port defined as the "add" port. In presence of nonnegligible losses, the filter of the invention may be regarded as an asymmetric structure, therefore the add port will be univocally defined and similarly univocally defined will also be the "drop" port.

The difference between the two optical paths of such a phase-shift stage (the first or the second) of the sequence, different from all the other phase-shift stages, may be indifferently greater or smaller than the difference of optical paths of the other phase-shift stages and must be intrinsically bidirectional as to cause a phase shift angle smaller or greater by $\pi$ than the phase shift angle that is introduced by all the other phase-shift stages of the filter.

This requirement of one or the first two cells (phase-shift stages) of the filter is instrumental in ensuring an outstandingly flat passband characteristic, essentially free of ripple.

The characteristics of the k+1 directional couplers (AD) are then optimized in function of the relative coefficients of the terms of the Fourier expansion series in order to improve the selectivity of the filter. Such an optimization, which is different from what occurs when employing a tapered distribution or a Chebychev distribution as in prior art approaches, has a practically negligible consequence in terms of increasing the ripple of the passband characteristic.

Therefore the selective static device of the invention is perfectly optimized also in terms of homowavelength crosstalk, though employing a considerably reduced number of stages, thus minimizing the power budged.

Operatively, after having denved the polynomial in function of the complex variable z, the parameters $\theta^i$ and $\phi^i$ may be extracted from the equation (4). The unknown parameters $\theta^i$ and $\phi^i$ must verity the following conditions:

$$\sum_{k=0}^{N+1} \Theta_i(f_o) = \frac{\pi}{2} - \delta_{phaseangle} \tag{5}$$

$$\Delta L_{geom} = m \cdot \lambda_{guided} = (m \pm \pi)\lambda_{guided} \tag{6}$$

$$FSR(f_o) = \frac{c}{n_g(f_o) \cdot m\lambda_{guided}} \tag{7}$$

where m is the order of the Mach-Zehnder interferometers that is of the phase-shift stages SF employed, $n_g$ is the group index and c is the speed of light in vacuum. The phase shift by $\pi$ must be introduced in an effective way along the sequence of cells in order to verify the condition (5) for a desired FWHM/FSR ratio and in respect of the position of the zeroes in the band of the channels that must or must not be extracted and of the chosen level of the sidelobes. The $\delta_{phase\ angle}$ may be considered at worst to be equal or less than 5% of $\pi/2$ on account of the fabrication process spread and of the spread in the tuning bias values.

The thermo-optical tuning may be effected by driving electrical heaters arranged in proximity of the straight arm of each phase-shift stage SF, in such a way as to introduce an identical incremental relative phase delay between the two paths of different length of all the Mach-Zehnder stages, by causing a local variation of the refraction index of the heated portion of waveguide.

The frequency response of such a filter is tuned by varying the temperature to which the straight portion of waveguide of the various phase-shift stages SF is heated. For waveguides made of silicon oxide ($SiO_2$), such a dynamically introduced phase shift is given by the following equation:

$$\Delta(T) = \frac{2\pi}{\lambda} \frac{\partial n_{SiO_2}}{\partial T} l_s \Delta T \tag{8}$$

The thermal conductivity at silica $n_{sio2}$ is in the order of 11.5 $\mu k^{-1}$ and $l_s$ is the length of the heating strip of metallic material.

EXAMPLE 1

A tunable "1-from-4" addidrop filter based on the principle of a resonating optical coupler has been realized in accordance with the present invention. The functional diagram of the device is schematically reproduced in FIG. 11, while each single cell of the interferometers device is depicted in FIG. 12.

One of the four wavelengths managed by the tunable device, present on the through input P1 port is directed to the drop output (Cross P4 port), while the other three wavelengths are directed to the through output port (Bar P2 port). Simultaneously, a local transmitter introduces a channel on a second input port (Bar P3 port) having the same carrier wavelength of the channel that is directed toward the drop output port (Cross P4 port), directing it to the second through output port (Cross P2 port).

Figure 13:
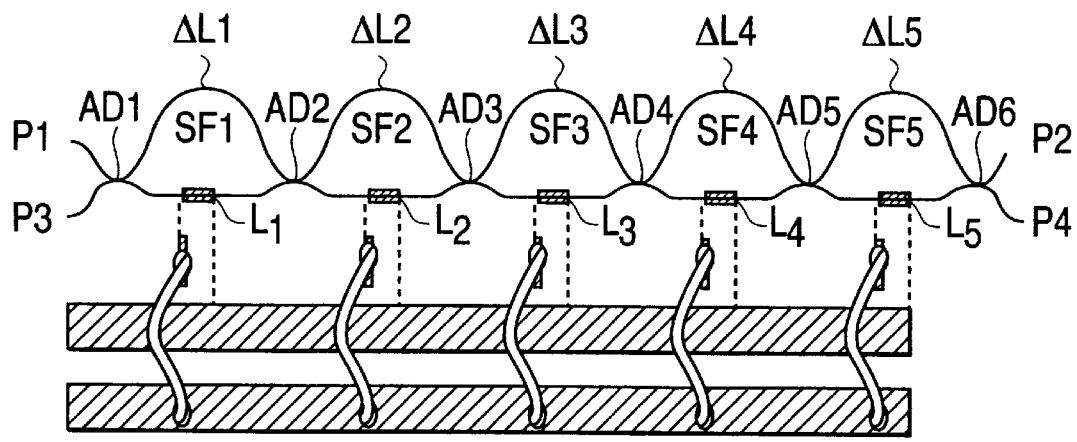
FIG. 13 is a layout of a five cell device of the invention.

An overall layout of the device is depicted in FIG. 13.

The device has been realized in a socalled "Glass-on-Silicon" technology with a lower cladding layer of phosphorus doped $SiO_2$ having a thickness of 12 μm, a waveguide of 8% phosphorus doped $SiO_2$ having dimensions 6.5*5.4 μm and with an upper cladding layer of boron and phosphorus doped $SiO_2$ with a thickness of 15 μm.

All the layers were deposited. by chemical deposition from vapor phase conducted at low pressure (LPCVD) and each deposited film was annealed at a temperature of about. 1000° C. to reduce stresses in the waveguide and to reduce losses.

The heaters $l_1, l_2, \ldots$ and $l_5$, are patterned chromium strips of 0.25*10 μm while the current distributing buses are of patterned gold strips of 0.5*300 μm, driven in a voltage mode (the driving mode being optional and may be chosen so as to optimize system's voltage and current requisites for controlling the tunable filter).

The $f_k$ coefficients of the Fourier expansion series (4) in the complex z plane for k=0, ..., 5, were calculated so as to approximate as much as possible the desired frequency response. The order m of the phase shifters (Mach-Zehnder interferometers or MZI) was chosen to be m=119.

The order m of the phaseshift stages, expressd as a whole number of the difference of guided wavelength optical paths between the two arms of each Mach-Zehnder interferometer, corresponded to a designed free spectral range (FSR) of the four-channel device of 12.8 nm, with a separation distance among channels of 3.2 nm.

The real dimensions of the chip were of 80*3 nm.

The differences of optical path ΔL and the relative phase shift angles ϕ of the five Mach-Zehnder stages of the device were the following:

$$\Delta L_1 = \lambda g * m \quad \phi_1 = 0$$
$$\Delta L_2 = \lambda g * (m + \pi/2\pi) \quad \phi_2 = 0$$
$$\Delta L_3 = \Delta L_1 \quad \phi_3 = 0$$
$$\Delta L_4 = \Delta L_1 \quad \phi_4 = 0$$
$$\Delta L_5 = \Delta L_1 \quad \phi_5 = 0$$

$\lambda_g$ representing the guided wavelength corresponding to the design wavelength $\lambda_p$ according to the relationship $\lambda_g = \lambda_p / \eta_{eff(\lambda p)}$, wherein $\eta_{eff(\lambda p)}$ corresponds to the effective refraction index of the medium with which the waveguide is made, at the design wavelength $\lambda_p$.

Measurements were effected by using a tunable laser and light was coupled through a standard unimodal fiber, aligned and butt coupled to the relevant input port, using an index matching oil according to common coupling techniques, while a coupling fiber to a power meter was aligned butt coupled to the relevant output port. A microprocessor controlled the laser, performing a wavelength scan and acquiring the relative power spectrum.

The tests were conducted by scanning the entire Free Spectral Range (FSR) of the filter by 50 pn increments for a total of 361 acquired points for each scan.

Figure 14:
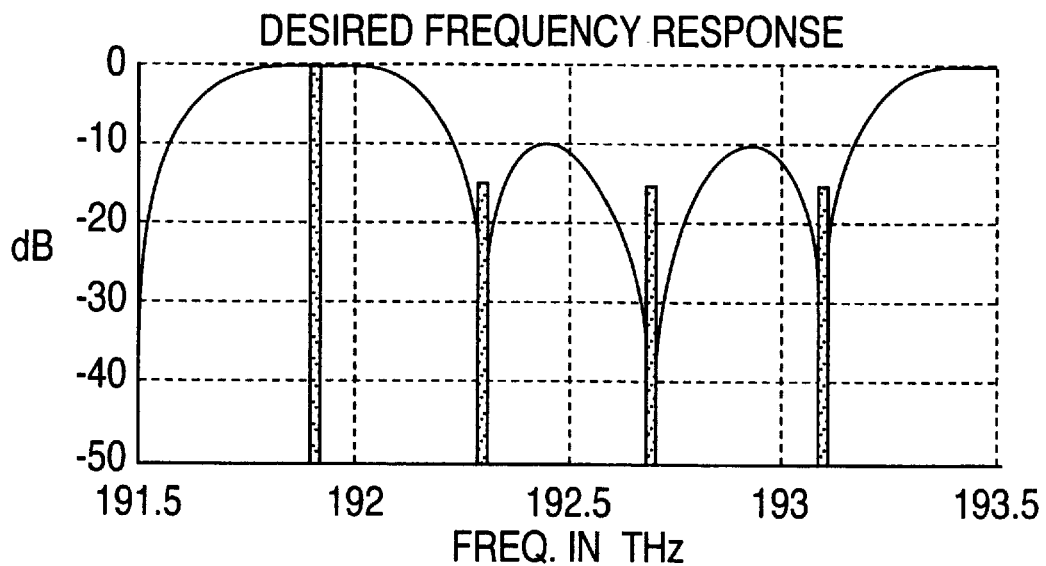
FIG. 14 shows the cross response characteristic of a device of the invention.
Figure 15:
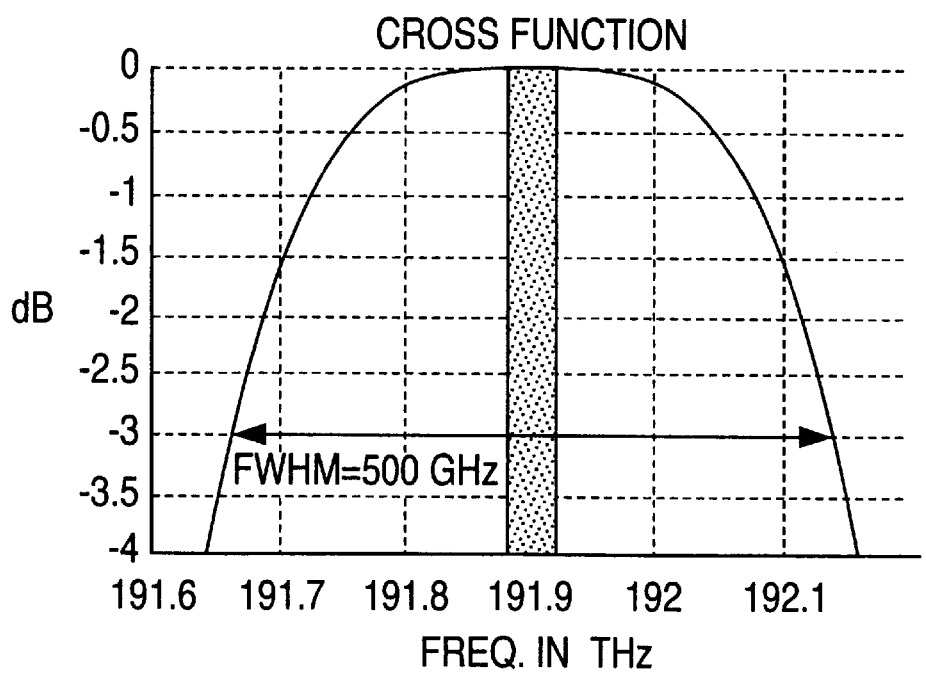
FIG. 15 shows the cross response characteristic at 3 dB of the device.

The complete cross response diagram is shown in FIG. 14, while the 3 dB cross response is shown in FIG. 15.

As may be observed, a bandwidth (FWHM) of 3.76 nm has been obtained.

The insertion loss measured on a reference sample of single Mach-Zehnder stage having the same curvature radius of those used for realizing the phase shift stages of the integrated device of the invention, was determined to be in the vicinity of −1.8 dB.

A corresponding loss for a straight waveguide of 8 cm was measured to be of 0.250 dB at 1550 nm showing that the fiber-to waveguide coupling was the dominant loss mechanism.

Figure 16:
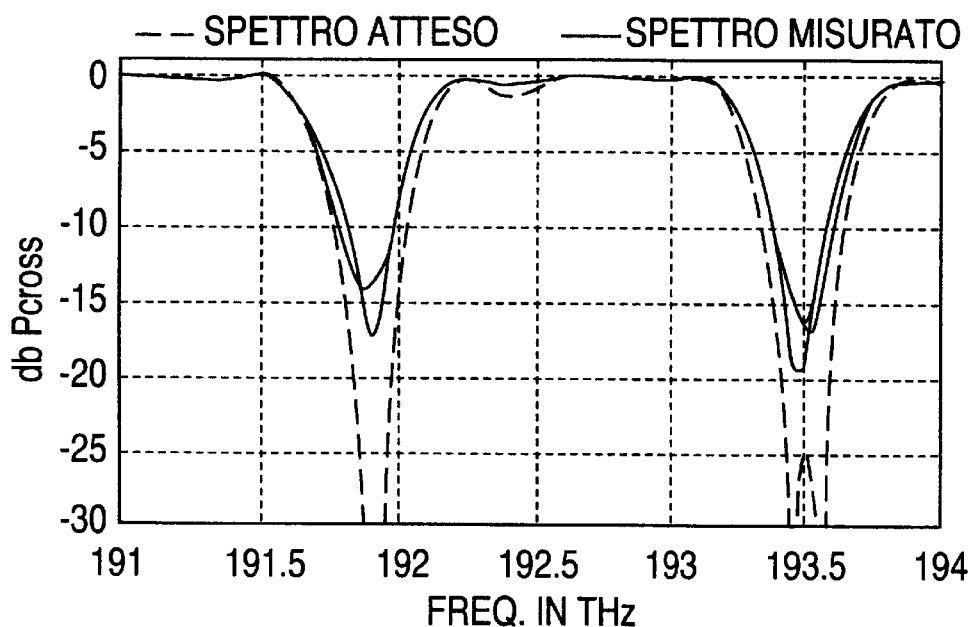
FIG. 16 shows a comparison between the design bar characteristic and the measured one.
Figure 17:
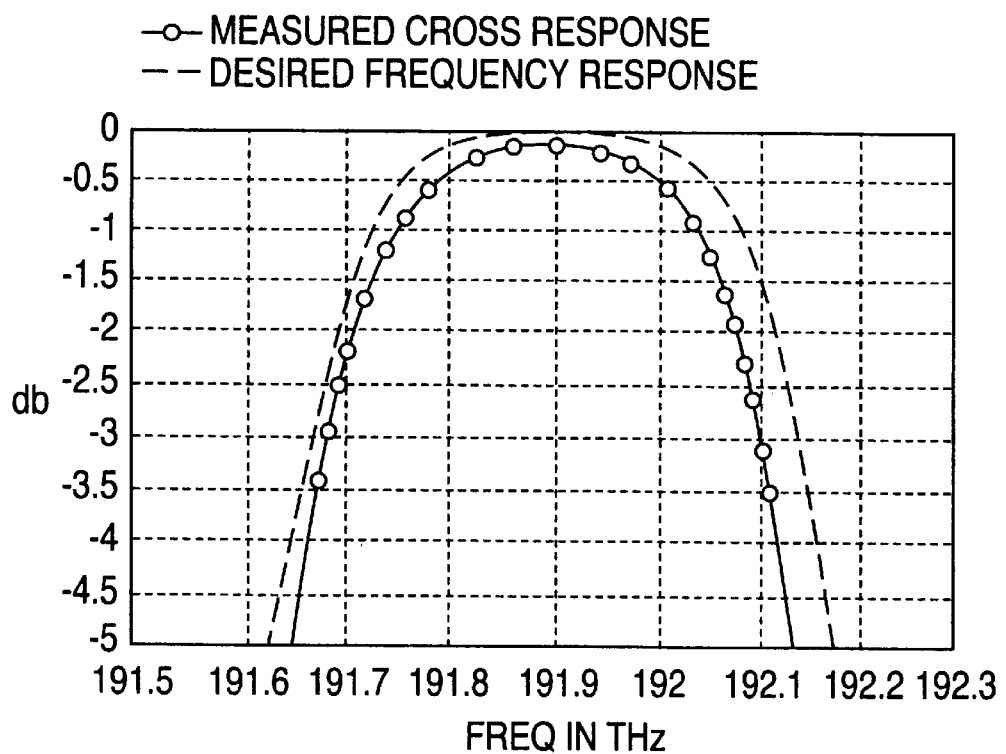
FIG. 17 shows a comparison between the design 3 dB cross characteristic and the measured one

For comparison purposes, the responses measured and the design ones are shown in FIGS. 16 and 17. The characteristics show an outstanding superimposition. In particular the SFR obtained coincides with the design one. The crosstalk coefficient on the extracted channel ($X_{bar}$) is of −18 dB (FIG. 16), while the crosstalk coefficient on the through channels ($X_{cross}$) is of −14 dB.

A measured FWHM of 400 GHz may be read from the diagram of FIG. 17, which is in good agreement with the design value and which may reasonably be improved further by reducing the losses and the coupling length.

The tunability of the filter through thermo-optical mechanism has been verified for the whole FSR.

Figure 18:
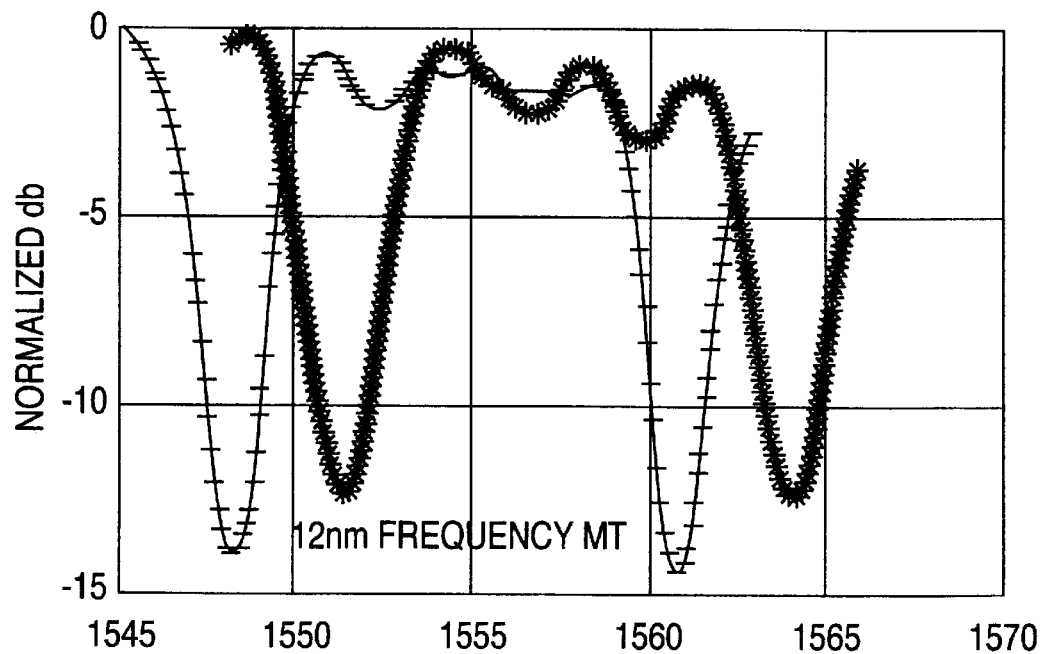
FIG. 18 shows the shift of the response characteristics along the wavelength axis obtained by thermo-optical effect.

FIG. 18 shows the shift of the response characteristics obtained with a regulation ratio of about 2V/nm

EXAMPLE 2

A second prototype filter has been realized by using the same fabrication techniques and the same technological parameters used in the Example 1, but inverting the relative dimensioning of the first two Mach-Zehnder interferometers so as to correspond to the following architecture parameters:

$$\Delta L_1 = \lambda g * (m + \pi/2\pi) \quad \phi_1 = \pi$$
$$\Delta L_2 = \lambda g * m \quad \phi_2 = 0$$
$$\Delta L_3 = \Delta L_2 \quad \phi_3 = 0$$
$$\Delta L_4 = \Delta L_2 \quad \phi_4 = 0$$

The response characteristics of this second prototype are substantially superimposable in terms of FWHM to those of the prototype of Example 1, thus demonstrating the possibility of obtaining the same FWHM with a different position of the MZI stage of different phase shift, which need to be such as to optimize the FWHM/FSR ratio and the secondary lobes (or sidelobes) level in a strict correlation between each other.

According to an important further aspect of the invention, several tunable devices may be interconnected in a loop arrangement to implement add/drop functions for an incremented number of channels or carrier wavelength, without substantially incrementing the insertion losses ($L_{through}$).

Figure 19:
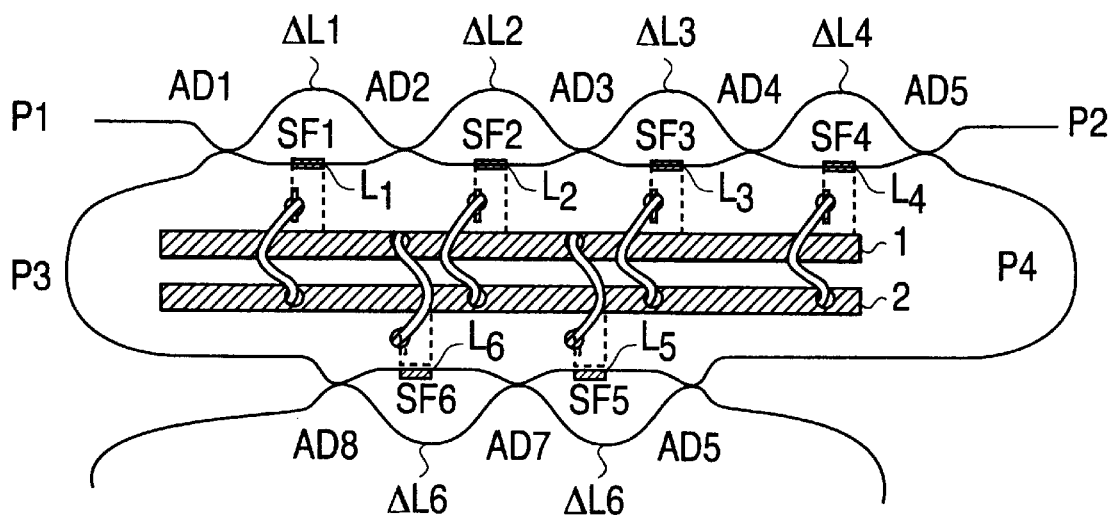
FIG. 19 shows the schematic layout of a modular add/drop device "1-from-8" composed of two tunable devices of the invention functionally connected in a loop.

FIG. 19 shows a functional diagram of an "1-from-8" add/drop device composed by two structures connected in a loop configuration: a first structure composed of four phase-shift Mach-Zehnder interferometer stages. SF1, SF2, ... and SF4, and a second structure composed of two phase-shift Mach-Zehnder interferometer stages: SF5 and SF6, AD1, ... AD8 being the respective directional couplers that compose the modular "1-from-8" filter.

The advantage of a modular architecture as the one depicted in FIG. 19 is represented by the fact that the through or pass channels are subject to insertion losses ($L_{through}$) corresponding to the losses attributable to the passage of the optical signals through the four cells of the first structure, while only te injected and extracted channel is subject to losses corresponding to the passage through the four cells of the first structure and through the two cells of the second structure looped to the first one.

Of course, the electrical buses 1 and 2 for applying a biasing voltage signal to the tuning elements S of the tuning control system may be advantageously common to the two structures.

The periodic nature of the add/drop filter of the invention may be exploited to design an add/drop optical filter capable of injecting and/or extracting selectable pairs of channels (carriers wavelength) of the WDM signal, by appropriately designing the spectral distance between the periodic reason peaks of the response characteristics of the filter.

Figure 20:
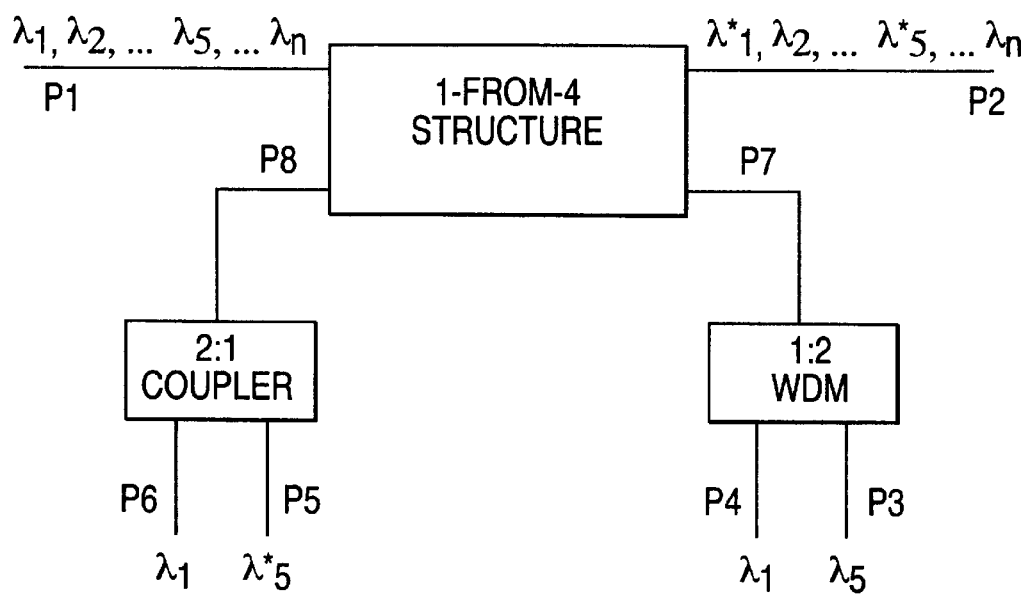
FIGS. 20 and 21 show a schematic layout of a "2-from-8" modular add/drop device derived from the "1-from8" device of FIG. 19 by the addition of a directional coupler 2:1.
Figure 21:
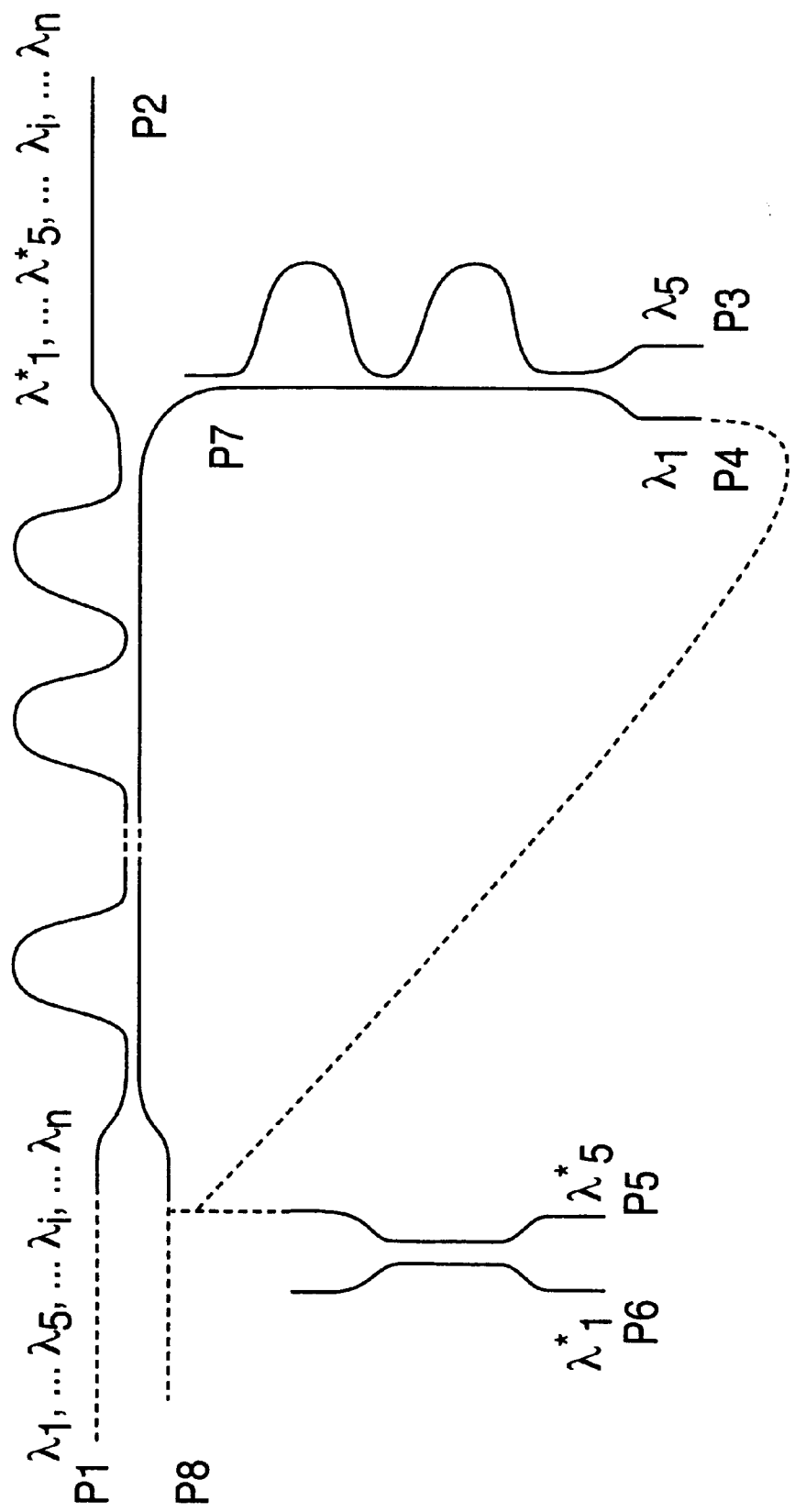

FIGS. 20 and 21 show the basic diagram of a "2-from-8" add/drop device (a six port device) derived from a "1-from-8" add/drop architecture including two distinct structures: "1-from-4" and "1-from-2".

According to this sample implementation, a selectable pair of channels (in the example $\lambda_1^*$ and $\lambda_5^*$) are being injected through the add port P8 of the tunable filter 1-from-4 structure, through a common 2:1 coupler, by applying the two optical wavelengths at the input ports P6 and P5 of the coupler.

The same selected pair of channels $\lambda_1$ and $\lambda_5$, will be present on the "drop port" 7 of the first 1-from-4 structure and the respective channels $\lambda_1$ and $\lambda_5$ will be present at the output ports P4 and P3 of the 1-from-2 structure. The WDM signal containing all eight channels ($\lambda_1 \ldots \lambda_5 \ldots \lambda_8$) fed through the port P1 of the 1-from-4 structure will be present as ($\lambda_1^*, \lambda_2 \ldots \lambda_5^* \ldots \lambda_8$) at the output port P2 of the 1-from-4 structure.

The integration layout is simplified because of the relative containment of the overall length of the chip, which is a nonnegligible aspect for developing tunable add/drop integrated devices capable of managing an increasing number of channels or carrier wavelengths.

Notwithstanding the fact that the description and the figures referred to preferred embodiments, the invention should not be considered limited to these is preferred embodiments but may be implemented also in different forms as a technician will from time to time chose to adopt to best suit his design needs. As already mentioned, a possible variation is that of exploiting an electro-optical mechanism, either per se or in cooperation with a thermo-optical mechanism for tuning the add/drop filter of the invention, by employing waveguides of a polymer or of lithium niobate that are materials known to be susceptible to a marked electro-optical effect besides to a thermo-optical effect. It is also possible to obtain a plurality of looped or linear structures connecting together a different number of elementary structures, so as to obtain a 1-from-8 add/drop filter, a 2-from-8 add/drop filter or add/drop filters with features different by the above disclosed 1-from8 or 2-from-8 filters.

What is claimed is:

1. Tunable add/drop optical device adapted to handle wavelength division multiplexed (WDM) signals, for injecting or extracting (add/drop) at least a selected optical channel or carrier wavelength in or from a set of multiplexed channels or carriers of different wavelength, comprising a plurality of directional couplers and a plurality of phase-shift stages, alternately connected in cascade, wherein each phase-shift stage defines a certain optical path length difference between two distinct optical paths of the stage, causing a periodic response characteristic with a spectral separation between two adjacent peaks of said periodic response characteristic sufficient to contain all deselected wavelengths of said multiplexed channels when a peak of the periodic response characteristic is centered on a selected wavelength, characterized in that the optical medium constituting one of said two distinct optical paths of each of said phase-shift stages has a refraction index dependent from a physical parameter belonging to the group composed of temperature and electric field intensity and the device includes bias means for controllably varying said parameter.

2. A tunable add/drop optical device adapted to handle wavelength division multiplexed (WDM) signals, for injecting or extracting (add/drop) at least a selected optical channel or carrier wavelength from a set of multiplexed channels or carriers of different wavelength, said optical device comprising:

a biasing circuit controllably varying a physical parameter;

plural directional couplers; and plural phase-shift stages alternately connected in cascade to said plural directional couplers, wherein each said at least one phase-shift stage has at least two distinct optical paths having a certain optical path length difference therebetween, said certain optical path length causing a periodic response characteristic with a spectral separation between adjacent peaks containing all deselected wavelengths of said multiplexed channels when a peak of the periodic response characteristic is centered on a selected wavelength, wherein the optical medium constituting one of said at least two distinct optical paths of each of said phase-shift stages has a refraction index varying in dependence on said physical parameter, and wherein said plural directional couplers and said plural phase-shift stages from at least one optical arrangement.

3. The optical device of claim 2, wherein said physical parameter is temperature or electric field.

4. The device according to claim 2, wherein two phase-shift stages of said plurality of phase-shift stages have different optical path length differences related to each other by a specific ratio, the remaining phase-shift stages having equal optical path length differences that are equal to the optical path length difference of one of said first two phase shift stages, and said plural directional couplers have coupling angles adding up to $\pi/2$, wherein said two phase shift stages are nearest an input port for the WDM signal.

5. The device according to claim 4, wherein said optical path length differences and said coupling angles correspond to phase shift angles and coupling angles derived from a Fourier series expansion polynomial of a frequency transfer function of the device, said expansion polynomial having an order corresponding to the number of the phase shift stages.

6. The device according to claim 5, wherein said derived phase shifts and coupling angles produce a zero of said transfer function in the vicinity of the carrier wavelength of a selected channel.

7. The device according to claim 2, wherein said at least one optical arrangement is implemented in an integrated form, said physical parameters is temperature and said biasing circuit includes Joule effect heating strips of a resistive material defined on the surface of an upper cladding dielectric layer in coincidence with the geometric projection of a straight portion of a waveguide of each of said phase-shift stages.

8. The device according to claim 2, wherein said at least one optical arrangement is in an integrated form, said physical parameter is electric field intensity, and said biasing circuit includes first electrically conducting field plates defined on the surface of an upper cladding dielectric layer in coincidence with the geometric projection of a straight portion of waveguide of each of said phase-shift stages and said biasing circuit also includes a second common field plate in the form of a continuous electrically conducting material on the bottom face of the integrated form.

9. The device according to claim 7, wherein the material of said straight portion of waveguide of each phase-shift stage is phosphorus doped silica glass.

10. The device according to claim 7 or 8, wherein the material of said straight portion of waveguide of each phase shift is a polymer.

11. The device of claim 8, wherein the material of said straight portion of waveguide of each phase-shift stage is lithium niobate.

12. The device according to claim 7, wherein each of said heating strips of resistive material is driven in a voltage or in a current mode and has a length of several millimeters and a width of several tens of micrometers and a thickness in the order of several hundreds of nanometers.

13. The device of claim 9, wherein said at least one optical arrangement includes Peltier cells disposed on the bottom face of the integrated form, juxtaposed to each heating strip defined on the upper cladding of the heated portion of waveguide.

14. The device according to claim 7, wherein each of said heating strips of resistive material is driven in an open loop mode.

15. The device according to claim 7, wherein each of said heating strips of resistive material is driven in a closed loop mode.

16. The device according to claims 7 or 9, wherein said resistive material is chromium or an alloy of microchromium.

17. The device according to claim 2, further comprising a dithering circuit to impart a low frequency modulation on the WDM signal by superimposing a sinusoidal contribution on a DC bias signal of said biasing circuit, and generating an error signal representative of the offset of the response peak form an ideal alignment with the selected wavelength.

18. The device according claim 2, including at least two of said optical arrangements having different numbers of phase shift stages and directional couplers looped together into a four port coupling device.

19. The device according to claim 18, wherein one of said at least two of said optical arrangements includes four phase shift stages and five directional couplers, the other of said at least two of said optical arrangements includes two phase shift stages and three directional couplers, said at least two of said optical arrangements forming together a 1-from-8 add/drop filter.

20. The device according to claim 2, including at least three of said optical arrangements having different numbers of phase shift stages and directional couplers, wherein one of said at least three of said optical arrangements includes four phase shift stages and five directional couplers, the other of said at least three of said optical arrangements includes two phase shift stages and three directional couplers, and the third of said at least three of said optical arrangements includes a coupler, forming together a 2-from-8 add/drop filter.

\* \* \* \* \*